United States Patent
Wang et al.

(10) Patent No.: US 12,061,093 B2
(45) Date of Patent: Aug. 13, 2024

(54) GENERATING NAVIGATIONAL PATH BASED ON SECURITY LEVEL

(71) Applicant: Lenovo (Singapore) Pte. Ltd., Singapore (SG)

(72) Inventors: Song Wang, Cary, NC (US); Jian Li, Durham, NC (US); Mengnan Wang, Chapel Hill, NC (US); Zhenyu Yang, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 57 days.

(21) Appl. No.: 17/700,963

(22) Filed: Mar. 22, 2022

(65) Prior Publication Data

US 2023/0304815 A1    Sep. 28, 2023

(51) Int. Cl.
  *G01C 21/34* (2006.01)
  *G01C 21/36* (2006.01)

(52) U.S. Cl.
  CPC ..... *G01C 21/3484* (2013.01); *G01C 21/3446* (2013.01); *G01C 21/3617* (2013.01); *G01C 21/365* (2013.01); *G01C 21/3694* (2013.01)

(58) Field of Classification Search
  CPC ............ G01C 21/3484; G01C 21/3446; G01C 21/3617; G01C 21/365; G01C 21/3694
  See application file for complete search history.

(56) References Cited

U.S. PATENT DOCUMENTS

| | | | |
|---|---|---|---|
| 11,024,083 B2* | 6/2021 | Kim | G06T 19/006 |
| 2002/0091702 A1* | 7/2002 | Mullins | G06F 16/25 |
| 2016/0345137 A1* | 11/2016 | Ruiz | H04W 4/024 |
| 2017/0082444 A1* | 3/2017 | Nair | G01C 21/206 |
| 2021/0080926 A1* | 3/2021 | Rubinson | G05B 19/4061 |
| 2021/0190504 A1* | 6/2021 | Hayes-Thakore | G01C 21/206 |

FOREIGN PATENT DOCUMENTS

| | | | |
|---|---|---|---|
| CN | 212181520 U | * | 12/2020 |
| KR | 20160017593 A | * | 2/2016 |
| KR | 102177223 B1 | * | 11/2020 |

OTHER PUBLICATIONS

English Translation KR20160017593A (Year: 2023).*

* cited by examiner

*Primary Examiner* — Rami Khatib
(74) *Attorney, Agent, or Firm* — FERENCE & ASSOCIATES LLC (57) ABSTRACT

One embodiment provides a method, including: identifying a user of a wearable device within an environment; determining a security level of the user for the environment; generating, based upon the determined security level of the user, a navigational path within the environment; displaying, on a display of the wearable device, the generated navigational path on the wearable device of the user; and tracking the user while moving along within the environment. Other aspects are described and claimed.

16 Claims, 3 Drawing Sheets

GENERATING NAVIGATIONAL PATH BASED ON SECURITY LEVEL

BACKGROUND

Individuals may need to have a particular security level clearance in order to access sensitive materials. This type of access may be present in the work place (e.g., work for a government entity, work for entities having sensitive or secret materials, work for entities having secure areas, etc.), recreational activities (e.g., video game advancement), athlete accessible areas (e.g., entering a baseball clubhouse), and the like. Such a security level associated with a person may be updated over time and may further provide more or less access to a secure environment. In order to gain a greater access to a secure area and/or achieve a higher security level, an individual may have to progress through a plurality of steps and/or meet consistent goals in order to determine that an individual may be trusted with accessing higher security information. For those that may not have the required security level, an individual will be barred from viewing sensitive information determined to be greater than their security level.

BRIEF SUMMARY

In summary, one aspect provides a method, including: identifying a user of a wearable device within an environment; determining a security level of the user for the environment; generating, based upon the determined security level of the user, a navigational path within the environment; displaying, on a display of the wearable device, the generated navigational path on the wearable device of the user; and tracking the user while moving along within the environment.

Another aspect provides an information handling device, including: a wearable device including a display; a processor operatively coupled to the display; a memory device that stores instructions that, when executed by the processor, cause the information handling device to: identify a user of the wearable device within an environment; determine a security level of the user for the environment; generate, based upon the determined security level of the user, a navigational path within the environment; display, on the display of the wearable device, the generated navigational path on the wearable device of the user; and track the user while moving along within the environment.

A further aspect provides a product, including: a storage device that stores code executable by a processor and, when executed by the processor, cause the product to: identify a user of the wearable device within an environment; determine a security level of the user for the environment; generate, based upon the determined security level of the user, a navigational path within the environment; display, on the display of the wearable device, the generated navigational path on the wearable device of the user; and track the user while moving along within the environment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In traditional security clearance methods, a system may assign a user a security level and permit the viewing of information based upon the assigned security level. This type of security level accessing typically includes a first level security access that permits access to some information, or perhaps a location. Such first level security access is typically given to new hires, visitors, and/or the like, and provides access to the least confidential information and areas. However, once the user has access, the system is not able to follow or track the user. Rather, it is simply recorded that a user was authenticated once and permitted to view some information or a visited a location. For example, first level security access may permit a user to enter a building via scanning an identification card, may allow a user to signing into a program on a device, and the like.

However, while requiring this first level of security access may deter a first type of non-accessible users from the location or information, once a user has accessed an area or a program, since the system is not contextually aware, any information or location that may actually be associated with a higher access level, but stored incorrectly or that does not require an additional access verification, may be inappropriately viewed or accessed by an individual without the correct clearance. Thus, the sensitive information becomes compromised.

In conventional methods, the lack of a system being contextually aware of the information present in an environment may result in this viewing of inappropriate information. Additionally, since the system is not contextually aware, it is also unable to track the location of the user within an environment. When the entire basis of a security system is to keep sensitive information secure and deny access to those without a determined accessible security level, and an inappropriate user does view such sensitive information, a system has been compromised and has failed as a whole. Thus, a system that may be contextually aware of sensitive information present in an environment, and thereafter, assuring that such sensitive information is not viewed based upon real-time updates of the contextually sensitive information a user may encounter, is needed.

Accordingly, an embodiment provides a method for generating a navigational path based upon a determined security level of a user within an environment. The system may determine information that may be appropriately viewed by the user and information that may not be permittable to view by the user. Additionally, the system may identify locations that are accessible and restricted to the user. Thereafter, in an embodiment, a system may alter a view of the sensitive information so that it is not viewable by the user. In an embodiment, the generated navigational path through an environment, based upon the determined security level of the user, may then be provided to a user on a display of a device. The navigational path identifies an appropriate path through an environment that reduces the users viewing of sensitive information and also avoids access to restricted areas. The system may also track the user while in the environment to further ascertain that a user is viewing only information and accessing locations deemed appropriate based upon their security level. Such a method may allow users to maneuver through an environment that may contain sensitive information without allowing the user to view the sensitive information or access restricted areas while in the environment without alerting the environment owner of such unauthorized access.

The illustrated example embodiments will be best understood by reference to the figures. The following description is intended only by way of example, and simply illustrates certain example embodiments.

Figure 1:
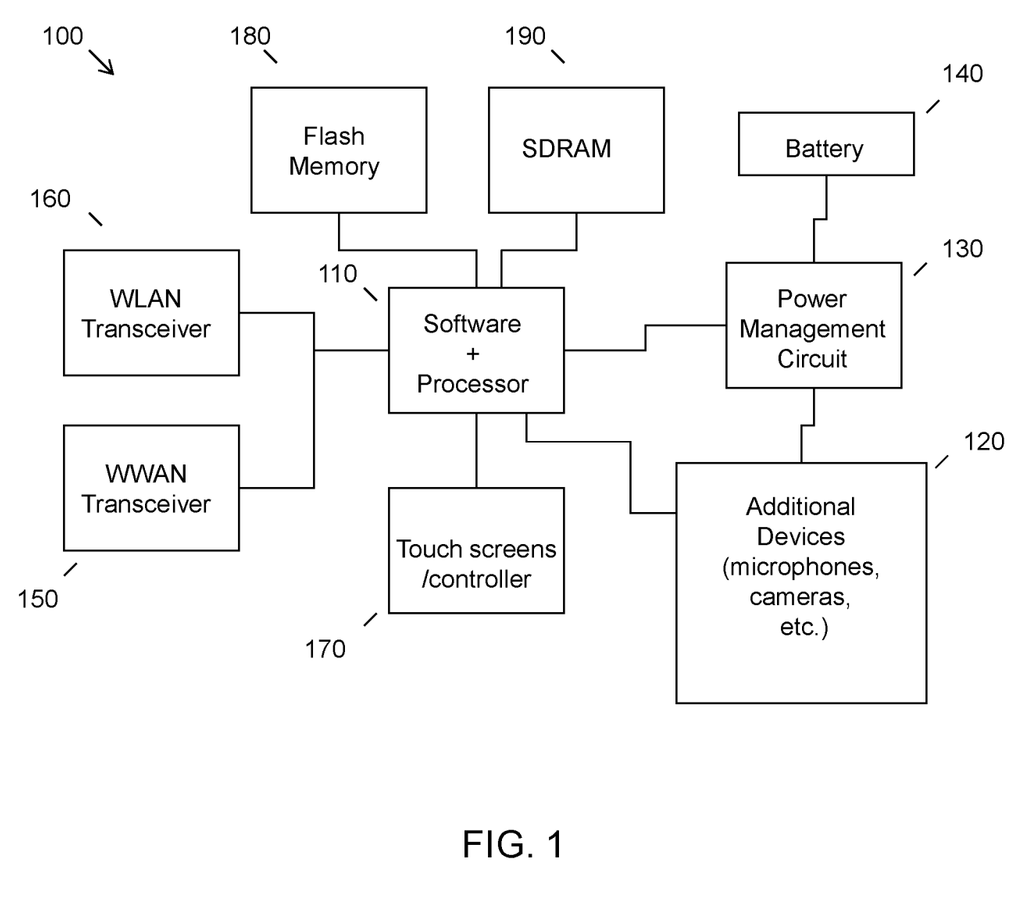
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
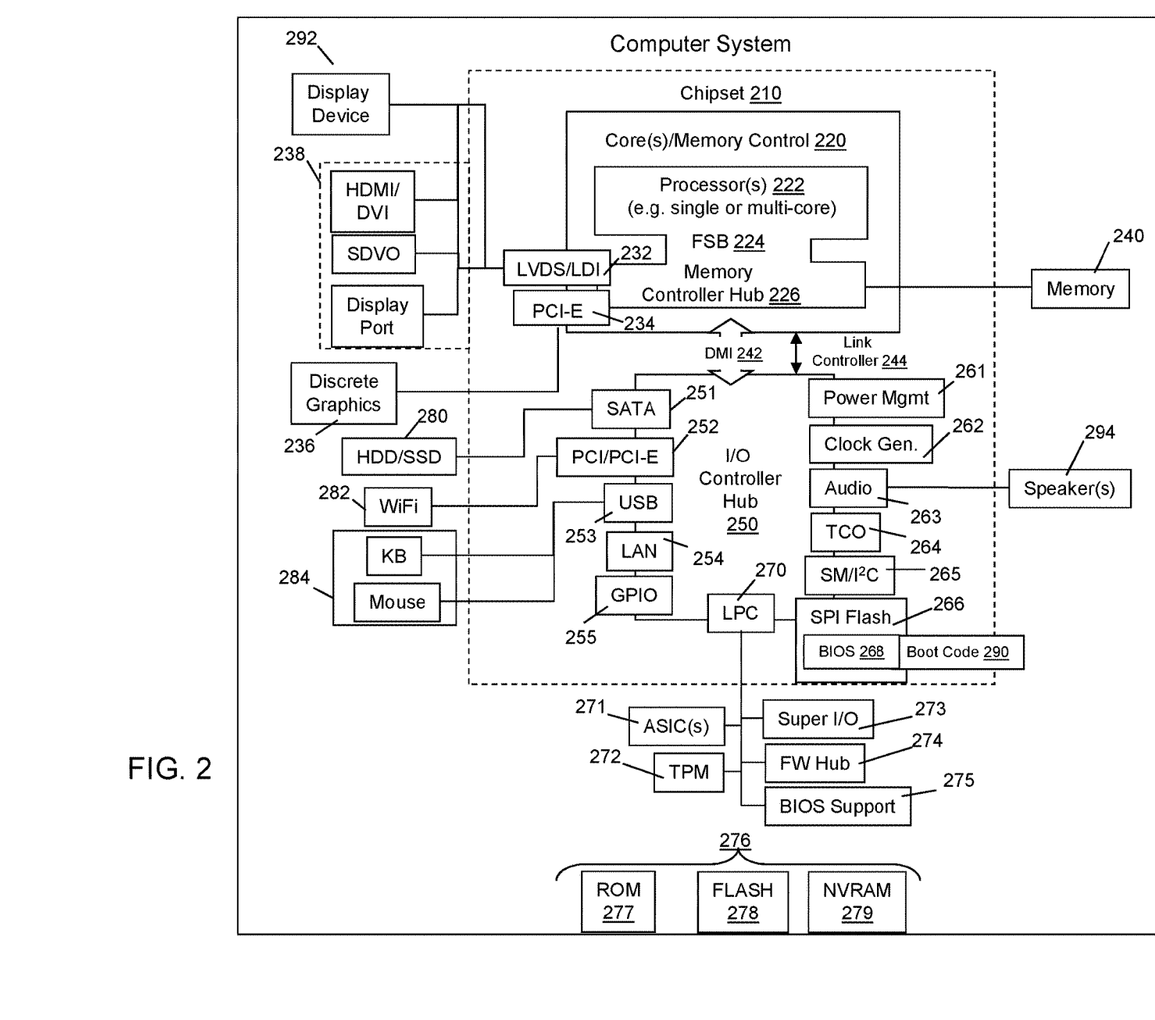
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that generate navigational paths through an environment based upon a determined security level of a user. For example, the circuitry outlined in FIG. 1 may be implemented in a tablet or smart phone embodiment, whereas the circuitry outlined in FIG. 2 may be implemented in a personal computer embodiment.

Figure 3:
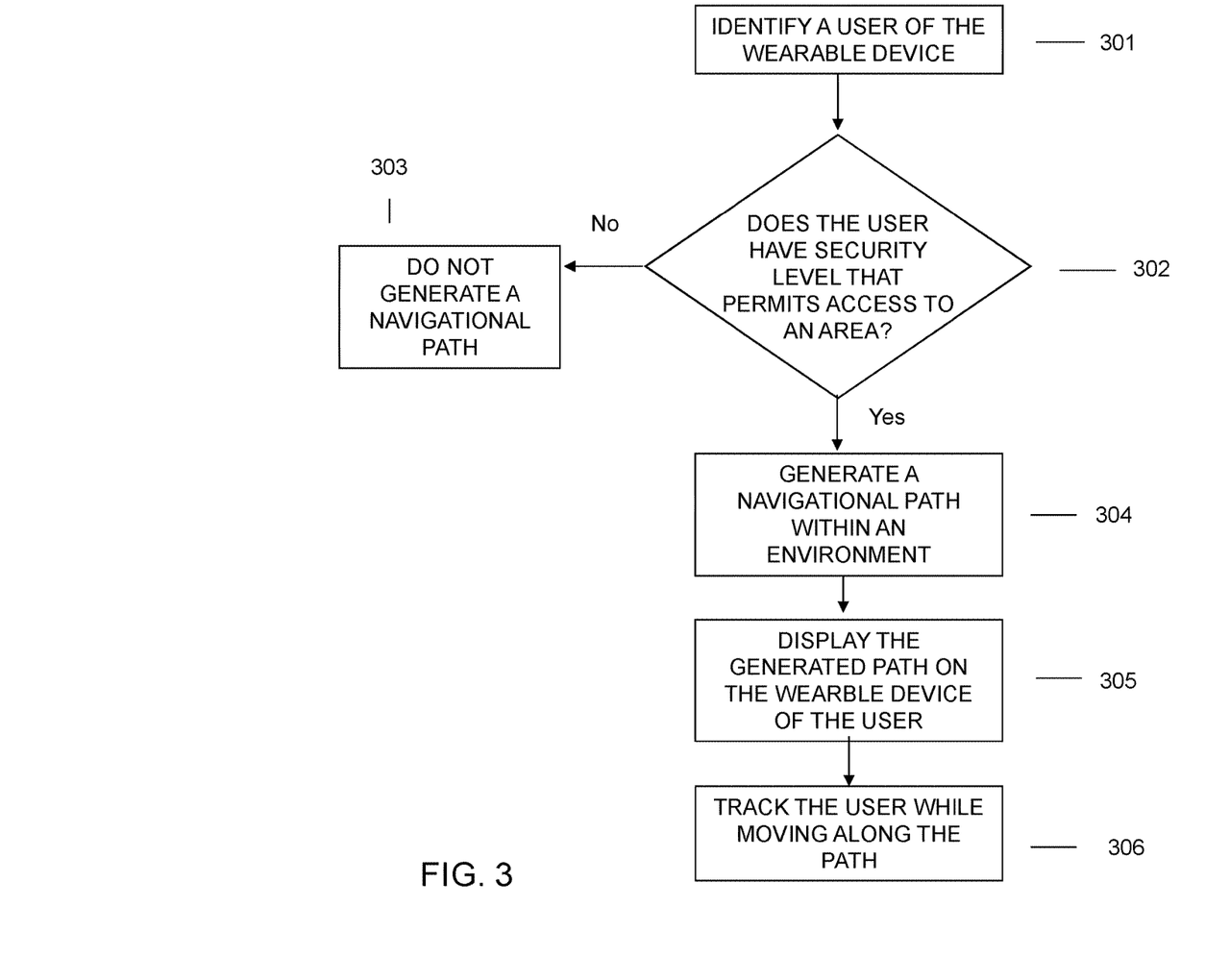
FIG. 3 illustrates an example method of generating a navigational path through an environment based upon a determined user security level.

FIG. 3 illustrates an example method for generating a navigational path through an environment containing sensitive information based upon the determined security level of the user and tracking the user as the user moves through the environment. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to generate navigational paths for users and track the user through an environment. Additionally, the security path generation and tracking system includes modules and features that are unique to the described system.

At 301, the security path generation and tracking system may identify a user of a wearable device within an environment. As described here, a wearable device may correspond to any information handling device that may be worn or attached to a user. In an embodiment, for example, the wearable device may include a smart watch, a virtual reality device, an augmented reality device, and the like. For ease of understanding throughout this application, continued reference to an augmented reality device, and specifically, a head-mounted augmented reality device, is utilized; however, it is important to regard such use of a head-mounted augmented reality device as a non-limiting example.

To identify a user of a wearable device within the environment 301, the security path generation and tracking system may collect user information. In an embodiment, a user may put on an augmented reality head-mounted display that may receive identification information associated with the user. Receiving the identification information may include the user providing the information to the system, the system scanning or recognizing the user and then accessing information corresponding to the user, a second user providing the information to the system, a combination thereof, and/or the like. Thus, the user identification data may be identified using one or more different user identification techniques, for example, a user providing biometric user data (e.g., scanning a fingerprint or palm, scanning an iris of the user, voice recognition, etc.), a user providing credential input (e.g., scanning an identification card, providing user credentials for logging into a system, etc.), and/or the like.

The identification information may be used by the security path generation and tracking system to determine an identity, and thereafter, one or more characteristics of the user. The one or more characteristics of the user may include, for example, personal data (e.g., name, birthdate, user credentials, etc.), physical characteristics of the user (e.g., hair color, skin color, gender, etc.), an associated security level of the user identifying a level of access granted to the user, and/or the like. In the case of a new user or visitor, the user may be granted with the lowest level of access. The level of access may be a default level of access, may be identified based upon the identification of the user and stored security level information corresponding to the user, provided by a second user (e.g., management, security, greeter, etc.), and/or the like.

Additionally, an embodiment may identify the environment a user is present within, for example, an office building, warehouse, production facility, public building, residence, and/or the like. Different environments have different security level access policies and also have different areas and information that is considered sensitive or that requires a particular security level to access. Thus, the environment may have an associated map and the map may identify different locations and corresponding security access levels. Additionally, the system may identify if the user is attempting to access a particular location. In other words, the system may identify a destination location of the user within the environment.

Additionally, the environment may have an identification of information that is considered sensitive or that requires a particular security access level to view. As can be understood, sensitive information may be movable. Thus, instead of identifying specific locations of sensitive information, which is also possible, the system may identify information types and corresponding security access levels. One technique is to learn correlations between particular symbols and security access levels. For example, sensitive information may be required to be labeled as such, or have a label, watermark, legend, or other identifier that identifies it as sensitive or requiring a particular security access level. In this case, the system may simply be able to match the access level identifier with a database or other data store to identify what security level is required to view the information.

The system may also, or alternatively, employ a learning algorithm, for example, a neural network, machine-learning model, and/or the like, to identify information as sensitive even if not in a designated sensitive location. Using a machine-learning model, the model can be trained on information that has corresponding security access levels, including those that do not require any security access level. From this training, the machine-learning model can learn correlations between particular information and security access levels. Using this training, the model can make predictions about new information and what security access level would be required to view the information. As new predictions are made, the machine-learning model can ingest the new information to become more accurate in the predictions.

At 302, the security path generation and tracking system determines whether the user has a security level that permits access to a particular area and/or sensitive information. First, the security path generation and tracking system may determine a security level of the user specific to the environment. As mentioned previously, the security level of the user may be manually input by a user (e.g., security, management, facility owner, etc.), and thereafter stored in an accessible data storage location. In an embodiment, the security level of the user may be determined through the identification of the characteristics of the user. In an embodiment, the initial security level of the user may be a standard or entry-level security level that may be updated over time based upon reoccurrences of a user within an area. For example, a security level of a user may be dynamically adjusted over time based upon a user's employment position within an entity, a user's relationship with others in the organization, a user's job requirements, and/or the like.

If the user does not have access to a particular area or sensitive information that allows the user to access the environment at all, the security path generation and tracking system may not generate a navigational path 303 for the user through the environment. In other words, if the user is not permitted within the environment, then a navigational path will not be generated. Additionally, if the security path generation and tracking system cannot identify a security level for the user, the system may not generate a navigational path. Another time that a navigational path may not be generated is if there is no path through the environment to get the desired location that would prevent the user from seeing sensitive information or accessing a restricted location.

On the other hand, when the security path generation and tracking system identifies that a user contains an acceptable security level to view at least one area of the environment and/or information within the environment, the security path generation and tracking system may generate a navigational path within the environment at 304. The security level of a user is one of, if not the, most critical components when generating such a path. In other words, for the security level of the user indicates to the system what information and/or areas may be appropriately viewed and/or accessed by the user. Thus, generating the navigational path includes identifying accessible areas within an environment for the user. The accessible areas may be based upon the map and/or identification of sensitive information as discussed further herein.

As an example, assume an environment of a four-story building. The company operating in such a building may indicate that the security level for floors one and three require a lower security level than what is needed in order to access floors two and four. Thus, in an embodiment, when determining that a user has a lower security level (not permitted to view the information present on floors two and four), the system may generate a navigational path through floor one to an elevator and up to floor three, thus, keeping the user from accessing and viewing information on floors two and four, as long as the user stays on the generated navigational path.

When generating the navigational path within the environment 304, the security path generation and tracking system may utilize a machine-learning algorithm to map the navigational path. The machine-learning algorithm may be dynamically updated based upon the information present within the environment. Thus, not only can the system generate a navigational path based upon historical information, but also based upon information that may change, thereby providing for a real-time navigational path generation. In an embodiment, when generating the navigational path, the machine-leaning algorithm may be utilized to design a navigational path to only pass by information determined to be appropriate for viewing by the user, and staying away from the information determined to be inappropriate.

In an embodiment, when generating the navigational path 304, the navigational path may be generated in substantially real-time as the user is moving through the environment, and may be based upon and updated based upon contextual information received in real-time. In other words, as information may move, barriers may occur, information or areas may be reclassified with respect to security access level, and/or the like, that may require a change in the navigational path based upon the security level of the user, the change can be implemented and updated in real-time. For example, if a piece of information is update to needing a higher security level than originally proposed, a system may dynamically update a generated navigational path so that the user may not view the information now determined as inappropriate. As another example, if the system determines that a high security level is not needed in order to view information, an embodiment may update the generated path permitting the viewing of additional information.

Generation of the navigational path may include loading at least one map of the environment based upon the security level of the user, onto the information handling device of the user, and thereafter displaying the one or more generated paths on the user wearable device at 305. For example, in an embodiment, where a single navigational path through an environment is generated for a user based upon the security level of the user, the system may load the single path to the augmented reality head-mounted display for a user to view while moving through the environment. In an embodiment, based upon the security of the user, the system may generate more than one potential path a user may follow through an environment. The multiple generated navigational paths may be loaded onto the user's wearable device and presented to the user on the display. The user may then determine the best route, from the multiple generated navigational paths, through the environment to a destination. In an embodiment, the maps uploaded to the user device may dynamically update and influence the route in which a user may elect to follow. A user may elect to switch between map types while moving through the environment.

Using the example of the augmented-reality head-mounted display, the system may display the generated path directly on the display in front of the user's eyes. Being that an augmented reality display permits that displaying of virtual images on a display while simultaneously viewing the physical environment around a user, an embodiment may seemingly overlay the generated path on the physical world. In another embodiment, for wearable devices that do not include augmented reality or that are not head-mounted, an embodiment may display the virtual path on the display of or associated with the device.

In an embodiment, when displaying the generated path on the wearable device of the user 305, the security path generation and tracking system may display a graphic in addition to the navigational path. The graphic may be based upon a characteristic of the current location of the user. For example, the graphic may be based upon an obstruction at the current location, a hazard at the current location, historical information related to the current location, or the like. For example, the graphic may identify a construction zone, the presence of hazardous materials, information of the location, and/or the like. Thus, the graphic may provide information that may influence a user's movement within the environment. For example, as a user is navigating through an environment, when hazardous material has been detected at a location, the display a user is using to view the navigational path may update and provide a triangle graphic with skull and crossbones within the triangle. In the case that the graphic is associated with something that impacts the navigational path, the generated navigational path may be updated to provide a user with an additional path or a detour around the impact.

The graphic may also be associated with information being provided by a facility owner, security, or other user of the entity. For example, a security person may provide the user with information regarding the navigational path. As another example, if a user determines the user wearing the device has strayed from the navigational path the user may provide a notification to the device user of such. The graphic may also be generated to prevent the user from seeing sensitive information. For example, if the user has accidentally come across sensitive information or information that is identified as sensitive but was not previously identified as sensitive, the system may generate a graphic to obscure the view of the sensitive information. Similarly, obscuring graphics can be generated and displayed if the user accesses a sensitive area.

Once a navigational path is being displayed on a display of the user wearable device, the security path generation and tracking system may track the user while moving within the environment at 306. In an embodiment, the tracking of the user in the environment may be performed utilizing one or more tracking techniques to determine the position of the user. In an embodiment, the one or more tracking techniques utilized may be a geographical positioning system (GPS), location tracking using environment sensors (e.g., image capture devices, location sensors, proximity sensors, infrared sensors, etc.). Additionally, or alternatively, the tracking technique may utilize a simultaneous localization and mapping (SLAM) technique. Thus, the security path generation and tracking system may be able to determine an exact location of a user within the environment in real-time. Accurate tracking of the user throughout the environment may assist in dynamically updating the generated navigational path, for example, in response to hazardous materials, relocation of sensitive materials, and/or the like. Additionally, when transitioning between maps generated for a user, if multiple maps were generated, the security path generation and tracking system may provide more accurate updates to the mapping based upon the determined current location of the user within the environment.

Tracking of the user while moving along the path may further influence more specific information for which a user may be permitted to view, and information the user is not permitted to view. In an embodiment, tracking the user and providing the exact location to of the user may allow the security path generation and tracking system to dynamically alter information present in a location of the environment which may thereafter be permittable for the user to travel through. In other words, after generating a navigational path for a user within an environment based upon the determined security level of the user, an embodiment may determine that along the generated path there may be one or more instances in which specific information associated with the security level the user does not have may be present.

As an example, in an embodiment, the generated navigational path for the user may direct the user to travel past one or more conference rooms. In an embodiment, determination that a conference room is in use may act as specific information that a user is not permitted to view. Thus, in an embodiment, when the user comes to the location of the conference room in use along the generated navigational path, the wearable device may alter image settings associated with the location of the conference room, deterring and negating a user's ability to view what is happening within the conference room. In an embodiment, altering the image settings may consist of blurring a user's ability to see information. For example, altering the image settings may consist of providing a warning label over non-permissible information. Further, being that an embodiment is tracking the user at all times while moving through the environment, an indication that a user is attempting to view inappropriate information may be supplied back to the system, which then notifies a facility user of the access to sensitive information or location.

In another embodiment, if a user strays off the generated navigational path to an area in which the user is not permitted to be based upon their determined security level, the system may alter the image settings for the entirety of the display. In other words, in an attempt to keep information from being compromised, an embodiment may totally blur a scene to keep from a user viewing sensitive information, while simultaneously providing direction as to how a user may exit the non-permissible location. For example, a navigation graphic that allows the user to navigate back to an accessible area, may be overlaid on an obscuring graphic that prevents viewing of the inaccessible area. In an embodiment, upon the determination that a user is in a location that they are not permitted to be in, an indication may be provided to the system and/or one or more operators of the system, notifying that a user is in an incorrect location.

Additionally, in an embodiment in which a user present in an environment loses connection to a network and/or the connection to the network is weak, the wearable device may utilize one or more sensors to collect location information associated with the user's current position, and then share this information back to the system and/or one or more operators. For example, when the Wi-Fi across a network is weak, an embodiment may capture image data associated with the user's position and provide the image data back to the system so that a determination of the where the user is in the environment may be inferred. The tracking of the user having a determined security level within the environment allows the security path generation and tracking system to more accurately determine what information is being viewed by the user within the environment, and potentially determine if and when a user is viewing information determined to be inappropriate.

The various embodiments described herein thus represent a technical improvement to conventional methods of directing a user through an environment. Rather than requiring a facility user to guide or escort a user through an environment to prevent access to inaccessible locations, the described system and method provides a technique for automating this while still maintaining security of the facility and information within the facility. Additionally, the system is able to take steps to obscure access to sensitive information and/or areas, which is not possible using conventional techniques. The system is able to track the user through the environment which allows the system to determine if the user is accessing sensitive information and/or areas, which is not possible when the user is simply directed to a location without an escort. Such an embodiment may allow users to maneuver through an environment that may contain sensitive information determined not permittable to be viewed by the user, and further ascertain that a user does not view inappropriate information or access inappropriate areas while in the environment.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, utilizing a wearable information handling device, a user within an environment;
    determining, utilizing the wearable information handling device, a security level of the user for the environment and a location of information within the environment that has an associated security level higher than the security level of the user;
    generating, based upon the determined security level of the user and utilizing a machine learning algorithm employed by the wearable information handling device, a navigational path within the environment to a destination of the user avoiding the information within the environment, wherein the generating comprises dynamically updating the navigational path in substantially real-time as the user is moving through the environment and based upon contextual information of the environment identifying locations of information having an associated security level higher than the security level of the user received in real-time and being identified as being along a previously generated navigational path;
    displaying, on a display of the wearable information handling device, the generated navigational path on the wearable device of the user; and
    tracking, utilizing the wearable information handling device, the user while moving along within the environment.

2. The method of claim 1, wherein the identifying the user comprises receiving user identification information from the user.

3. The method of claim 2, wherein the receiving user identification information comprises capturing utilizing one or more sensors a user characteristic.

4. The method of claim 3, wherein the utilizing the one or more sensors to capture the user characteristic comprises utilizing an IR scanner to scan the user's iris.

5. The method of claim 1, wherein the generating a navigational path comprises identifying accessible areas for the user within the environment based upon the security level.

6. The method of claim 1, comprising providing a notification to another user responsive to detecting the user is not located on the navigational path.

7. The method of claim 1, wherein the generating comprises loading at least one map of the environment based upon the security level, wherein different security levels comprises different maps.

8. The method of claim 1, comprising displaying, on the display of the wearable device, a graphic in addition to the navigational path based upon a characteristic of a current location of the user.

9. An information handling device, comprising:
a security path generation and tracking system;
a wearable device comprising a display;
a processor operatively coupled to the display;
a memory device that stores instruction that, when executed by the processor, cause the information handling device to:
identify a user of the wearable device within an environment;
determine a security level of the user for the environment and a location of information within the environment that has an associated security level higher than the security level of the user;
generate, based upon the determined security level of the user and utilizing a machine learning algorithm, a navigational path within the environment to a destination of the user avoiding the information within the environment, wherein the generating comprises dynamically updating the navigational path in substantially real-time as the user is moving through the environment and based upon contextual information of the environment identifying locations of information having an associated security level higher than the security level of the user received in real-time and being identified as being along a previously generated navigational path;
display, on the display of the wearable device, the generated navigational path on the wearable device of the user; and
track the user while moving along within the environment.

10. The information handling device of claim 9, wherein to identify the user comprises receiving user identification information from the user.

11. The information handling device of claim 10, wherein the receiving user identification information comprises capturing, utilizing one or more sensors, a user characteristic.

12. The information handling device of claim 11, wherein the utilizing the one or more sensors to capture the user characteristic comprises utilizing an IR scanner to scan the user's iris.

13. The information handling device of claim 9, wherein to generate a navigational path comprises identifying accessible areas for the user within the environment based upon the security level.

14. The information handling device of claim 9, comprising providing a notification to another user responsive to detecting the user is not located on the navigational path.

15. The information handling device of claim 9, wherein to generate comprises loading at least one map of the environment based upon the security level, wherein different security levels comprises different maps.

16. A product, comprising:
a storage device that stores code executable by a processor and, when executed by the processor, cause the product to:
identify, utilizing a wearable information handling device, a user within an environment;
determine, utilizing the wearable information handling device, a security level of the user for the environment and a location of information within the environment that has an associated security level higher than the security level of the user;
generate, based upon the determined security level of the user and utilizing a machine learning algorithm employed by the wearable information handling device, a navigational path within the environment to a destination of the user avoiding the information within the environment, wherein the generating comprises dynamically updating the navigational path in substantially real-time as the user is moving through the environment and based upon contextual information of the environment identifying locations of information having an associated security level higher than the security level of the user received in real-time and being identified as being along a previously generated navigational path;
display, on the display of the wearable information handling device, the generated navigational path on the wearable device of the user; and
track, utilizing the wearable information handling device the user while moving along within the environment.

* * * * *